May 23, 1961 A. B. MUTCHLER 2,985,154
ROTARY ENGINE
Filed Nov. 7, 1960 2 Sheets-Sheet 1
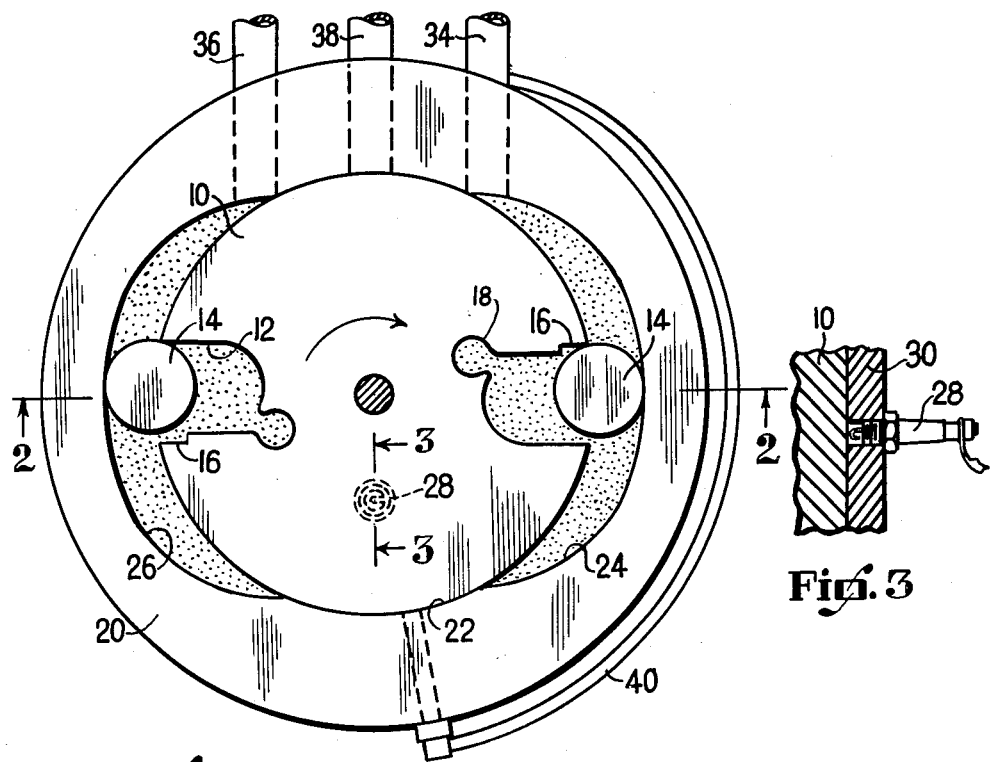
Fig. 1
Fig. 3
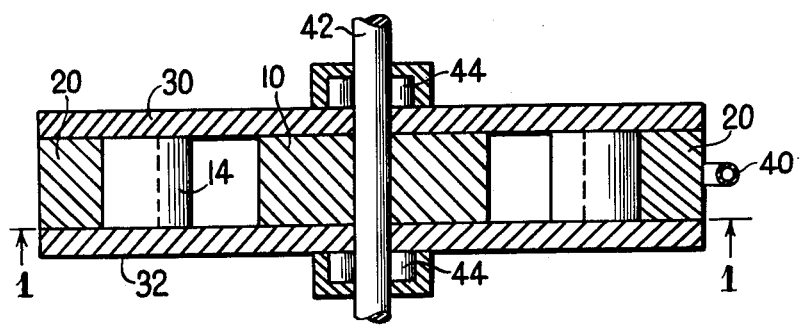
Fig. 2
INVENTOR.
Aubrey B. Mutchler.

INVENTOR.
Aubrey B. Mutchler

2,985,154
ROTARY ENGINE
Aubrey B. Mutchler, Rte. 1, Palisade, Colo.
Filed Nov. 7, 1960, Ser. No. 67,567
3 Claims. (Cl. 123—8)

The present invention relates to internal combustion engines of the rotary type.

An object of the present invention is to provide an internal combustion engine of high efficiency, one having few parts easily constructed and easily assembled, one which operates with a minimum of friction, and one which is economical to manufacture.

Another object of the present invention is to provide a rotary engine which provides optimum performance at either low or high speeds, one having little or no back pressure in the exhaust, and one which may be manufactured in any size to meet any situation.

Figure 4:
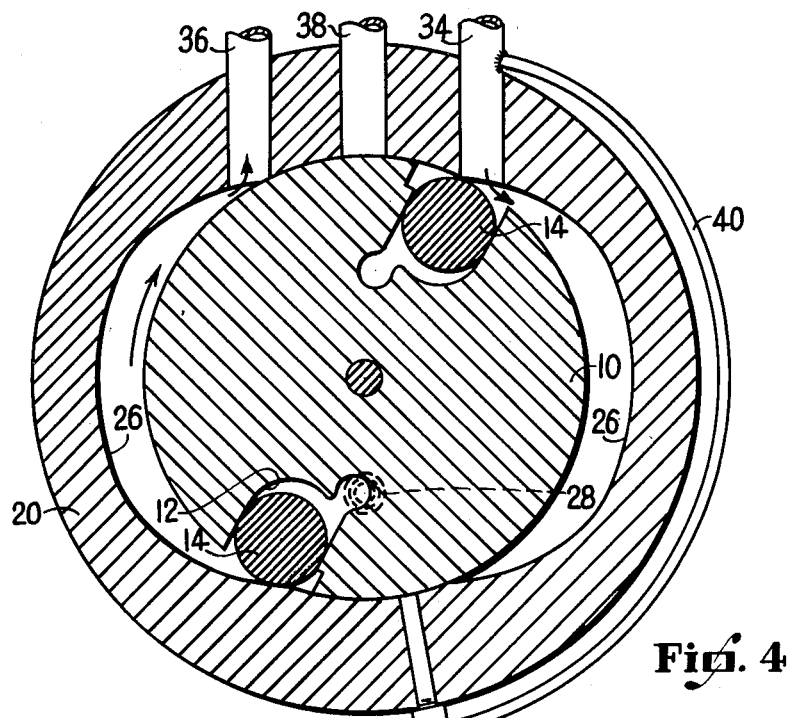
Figure 5:
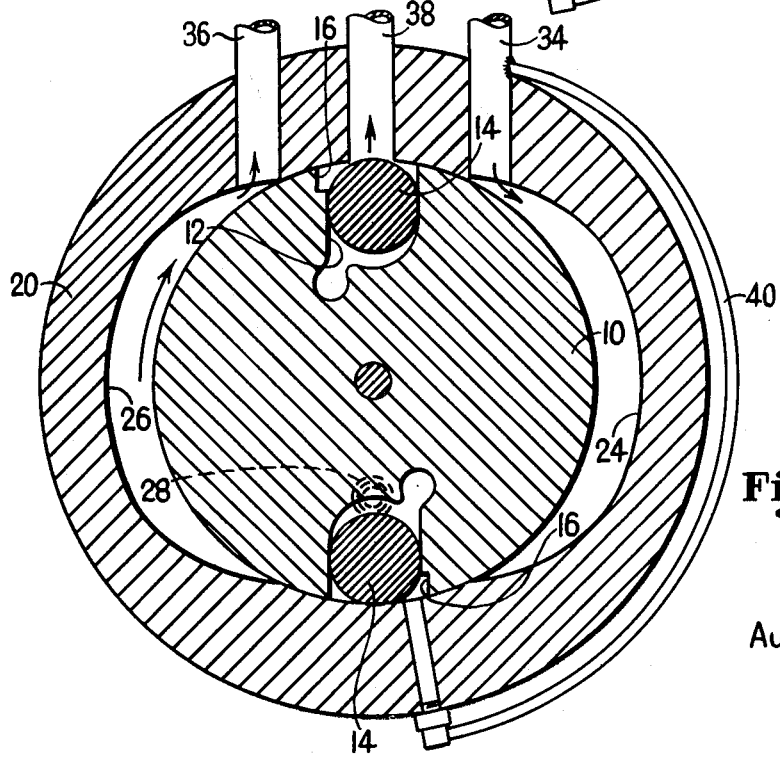

These and other objects will be fully apparent from the following description when taken in connection with the annexed drawings in which:

Figure 1 is a view of the engine with one face of the housing removed therefrom, Figure 2 is a view taken on the line 2—2 of Figure 1, Figure 3 is a view taken on the line 3—3 of Figure 1, Figure 4 is a sectional view showing the position of the rotor of the engine immediately prior to intake of a fuel-air mixture, and Figure 5 is a sectional view showing the rotor in position in which one of the combustion chambers is being ignited and the other one scavenged of combustion products.

With continued reference to the drawings in which like numerals indicate like parts throughout the several views, the engine of the present invention comprises a rotor 10 having a pair of diametrically opposed combustion chambers 12 opening out of the periphery of the rotor 10.

A roller 14 is disposed in each of the chambers 12 and is freely moveable therein but is of such size as to frictionally engage the walls of the chamber 12 excepting only an offset portion 16 of the one wall of the rotor 10. Each chamber 12 has a circular recess at its bottom as at 18 forming a pocket for the combustion material which may be atomized liquid fuel in an air mixture or other combustible air mixture.

A housing 20 is circumposed about the rotor 10 and is provided with a portion of its inner wall slidably engaged by a part of the periphery of the rotor 10, the part of the inner wall of the housing 20 being designated by the numeral 22 in Figure 1.

The inner wall of the housing 20 is also provided with a pair of diametrically opposed recesses constituting a compression chamber 24 and an expansion or exhaust chamber 26.

When the rotor 10 rotates, the rollers 14 are forced outwardly into rolling and frictional engagement with the walls of the chambers 24 and 26.

A glow plug 28 is threaded into one end plate 30 of the housing 20 and is in communication with each of the combustion chambers 12 when the rotor 10 rotates. Another end plate 32 covers the other side of the rotor 10 remote from the end plate 30 when the engine is assembled. The housing 20 is provided with an inlet conduit or inlet 34 having one end in communication with the chamber 24 and with an exhaust or outlet conduit 36 in communication with the chamber 26. An additional exhaust 38 is provided for scavenging the portion of the combustion chamber 12 exteriorly of the respective roller 14, as in Figure 5.

A bypass conduit 40 has one end in communication with the wall part 22 of the housing 20 and the other end in communication with the inlet 34, as shown in Figure 1.

A drive shaft 42 is secured to the rotor 10 and is driven thereby with suitable packing means at each end of the housing 20 as at 44 in Figure 2.

In operation, when the rotor 10 is rotated in the direction of the arrow shown in Figure 1 the rollers 14 travel outwardly into rolling and frictional engagement with the air wall of the housing 20 and serve, as in Figure 1, to draw a fuel air mixture through the conduit or inlet 34 into the chamber 24.

As the charge is drawn into the chamber 24 it is forced into the combustion chamber 12 of the rotor 10 and the roller 14 returns to its position as shown in Figure 5 compressing the charge in the chamber 12.

When the rotor 10 rotates to bring the chamber 12 adjacent the glow plug 28 the charge in the chamber 12 is ignited and expands as the rotor turns, pushing the respective roller 14 ahead of it as in Figure 1 and pushing the exhausted gas ahead of the roller 14 out of the exhaust outlet 36.

The bypass conduit 40 permits the excess compressed gas exteriorly of each rotor 14 to return to the inlet 34, adding to the compress of gas admitted to the compression chamber 24.

It will be seen therefore that once the rotor 10 is given a rotary movement and suitable fuel air mixture is introduced into the conduit or inlet 34 the action of the engine will be automatic from there on and the speed of the engine will be governed by the air-fuel mixture admitted thereto.

What is claimed is:

1. A rotary internal combustion engine comprising a rotor provided with a combustion chamber opening out of the periphery thereof, and a roller disposed in said chamber, a housing circumposed about said rotor and having a portion of the inner walls slidably engaged by a part of the periphery of said rotor, said housing inner wall being provided with a compression chamber and an exhaust chamber into each of which said roller may roll to sealingly engage the wall of said housing exhaust chamber and compression chamber upon execution of rotary movement of said roller, there being an inlet in said housing connected in communication with said compression chamber, an outlet connected in communication with said exhaust chamber, and means for igniting for a charge of fuel air mixture when in said combustion chamber.

2. A rotary internal combustion engine comprising a rotor provided with a combustion chamber opening out of the periphery thereof, and a roller disposed in said chamber, a housing circumposed about said rotor and having a portion of the inner walls slidably engaged by a part of the periphery of said rotor, said housing inner wall being provided with a compression chamber and an exhaust chamber into each of which said roller may roll to sealingly engage the wall of said housing exhaust chamber and compression chamber upon execution of rotary movement of said roller, there being an inlet in said housing connected in communication with said compression chamber, an outlet connected in communication with said exhaust chamber, and means for igniting a charge of fuel air mixture when in said combustion chamber, said roller being adapted to be forced into sealing engagement with the wall of said exhaust chamber by the pressure of the expanded combustion products in said combustion chamber.

3. A rotary internal combustion engine comprising a rotor provided with a combustion chamber opening out of the periphery thereof, and a roller disposed in said chamber, a housing circumposed about said rotor and having a portion of the inner walls slidably engaged by a part of the periphery of said rotor, said housing inner wall being provided with a compression chamber and an exhaust chamber into each of which said roller may roll to sealingly engage the wall of said housing exhaust chamber and compression chamber upon execution of rotary movement of said roller, there being an inlet in said housing connected in communication with said exhaust chamber, means for igniting for a charge of fuel air mixture when in said combustion chamber, and a drive shaft driven by said rotor.

No references cited.